Feb. 9, 1937. A. G. BUTLER 2,069,994
FOLDING LANDING GEAR
Filed April 27, 1935
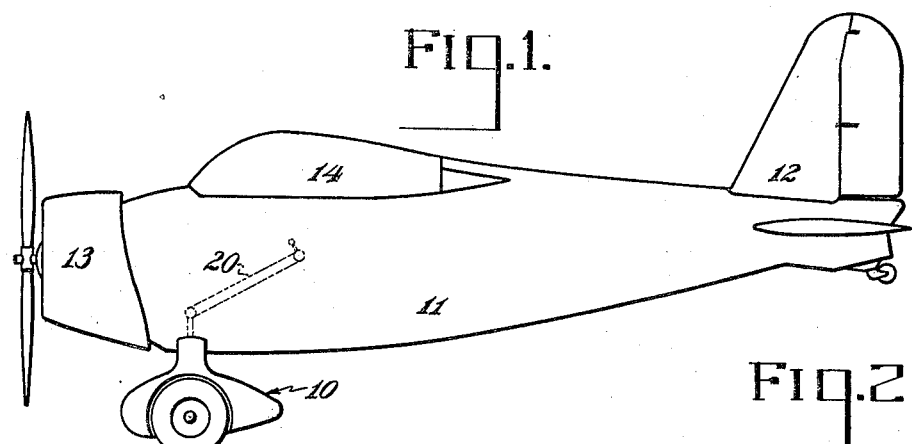
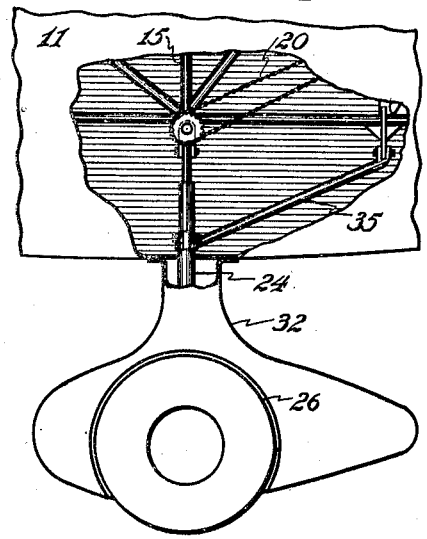
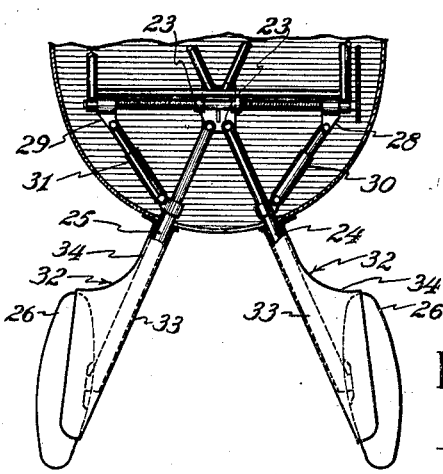
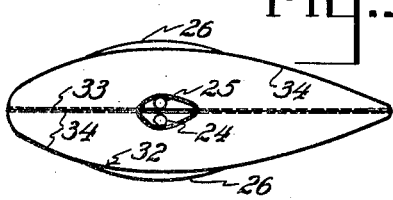
INVENTOR.
ARTHUR G. BUTLER.

Patented Feb. 9, 1937

2,069,994

UNITED STATES PATENT OFFICE 2,069,994

FOLDING LANDING GEAR

Arthur G. Butler, Buffalo, N. Y., assignor, by mesne assignments, to Curtiss-Wright Corporation, a corporation of New York Application April 27, 1935, Serial No. 18,597

3 Claims. (Cl. 244—103)

This invention relates to aircraft landing gears. Generally, the invention contemplates providing a folding landing gear of simple construction, by which the landing gear drag may be materially reduced in flight. It is known that numerous forms of retractable landing gears have been proposed, wherein the landing gear may be completely or partially retracted within the aircraft when the latter is in flight In retractable gears, a considerable amount of space is required in the aircraft for stowage of the gear, and usually a rather complex mechanism is required to extend and retract the landing gear. In this invention I propose to provide a landing gear which at all times extends from the aircraft but which, in flight, may be consolidated to present a streamline form of materially less drag than would be encountered in the normal fixed landing gear.

An object of the invention is to provide a folding landing gear in which the two laterally disposed elements thereof are movable between extended positions for landing, and a central position for flight.

A further object is to provide a divided streamline fairing for an aircraft landing gear.

Still another object is to provide mechanism for swinging elements of a landing gear between extended positions and a folded position wherein said elements lie substantially in the plane of symmetry of the aircraft.

A further object is to provide shock absorbing struts which serve the dual function of linking the landing gear struts with the folding mechanism, and of holding the landing struts in folded position when in flight.

Additional objects will become apparent in reading the subjoined specification and claims and from a consideration of the drawing, in which similar numbers indicate similar parts, and in which:

Fig. 1 is a side elevation of an aircraft embodying the landing gear of this invention;

Fig. 2 is an enlarged side elevation, partly broken away, of a portion of the aircraft fuselage and of the landing gear;

Fig. 3 is a front elevation, partly in section, of the landing gear in its folded position;

Fig. 4 is a front elevation, similar to Fig. 3, showing the landing gear in extended position; and Fig. 5 is a section on the line 5—5 of Fig. 3.

The landing gear 10 of this invention is adapted to be applied to any conventional aircraft, that shown being of the high wing monoplane type including a fuselage 11, empennage 12, power plant 13 and monoplane lifting surface 14. Crew accommodations are provided as usual, within the fuselage 11. The fuselage includes the normal structural skeleton 15, to the lower side of which, within the fuselage skin 16, a transverse rotatable shaft 17 is mounted. The shaft is provided with right and left-handed screw threads 18 and 19 on opposite sides of the fuselage plane of symmetry, and a suitable sprocket and chain drive 20 is provided at one end of the shaft 17 for turning thereof by a member of the aircraft crew. The central portion of the fuselage skeleton 15 is provided with a fitting 21 having longitudinal pivots 22 and 23 carrying downwardly extending struts 24 and 25, these struts being capable of swinging movement from a position such as shown in Fig. 3 to a position such as that shown in Fig. 4. Each strut carries a wheel 26 at its lower end, the wheel axes being angled with respect to the struts, so that when the struts are extended, as in Fig. 4, the plane of each wheel will be substantially vertical. A suitable slot 27 is formed in the fuselage covering 16 to permit of the lateral swinging of the struts. In the folded position, the struts lie adjacent the aircraft plane of symmetery, whereas in their extended position they extend outwardly and downwardly from the aircraft fuselage.

Nuts 28 and 29 are respectively mounted on the oppositely threaded portions of the shaft 17 so that, by turning the sprocket mechanism 20, the nuts 28 and 29 are either moved inwardly or outwardly from the plane of symmetry in accordance with the direction of rotation of the shaft. A link 30 pivotally connects the nut 28 with the strut 24 at a point thereof remote from the strut pivot 23 and similarly, a link 31 pivotally connects the nut 29 with the strut 25 at a point on the latter remote from its pivot 23. Preferably, the struts 30 and 31 comprise compressible shock absorber units of a type well known in the art, and the pivot 40 of the lower end of each strut 30 or 31 with respect to its associated strut 24 or 25 is so arranged that when the nuts 28 and 29 are moved inwardly, the struts 24 and 25 reach their extreme inward position slightly before the nuts 28 and 29 reach their extreme inward position. Thereby, the struts 30 and 31 are slightly compressed when the nuts are moved inwardly, to hold the landing gear from lateral oscillation.

Each strut 24 and 25 is provided with a fairing 32 which is formed to embrace a part of each wheel 26. The inner face 33 of each fairing is flat, while the outer face 34 thereof is of streamlined curved conformation, so that when the landing gear is folded to the position shown in Fig. 3, the outer surfaces 34 of the fairings comprise a streamlined cover of optimum form for both units of the landing gear. When the landing gear is extended, the flat faces 33 of the fairings 32 separate and are addressed by the air passing between them.

It is well known that the interference to air flow of individual members projecting into the airstream is considerably greater than the interference of two similar members placed closely adjacent one another. Therefore, as shown in Fig. 4, the interference of the two landing gear elements when they are extended, is substantially greater than the interference occasioned by the two struts when they are closely adjacent one another, as shown in Fig. 3. Particularly, when the fairings 32 are organized for coaction when the landing gear is folded, the drag of the landing gear is minimized.

An additional advantage is presented by this invention in that the landing wheels are always in a position for ground contact, and should the aircraft crew fail to extend the landing gear upon landing, it is quite conceivable that when ground contact is established with the landing gear in folded position, the pilot may still extend the landing gear without damage to the aircraft, so long as the speed of the aircraft relative to the air is sufficient to prevent lateral tilting thereof prior to establishment of a substantial tread for the landing gear.

Each side of the landing gear may be suitably reinforced, as shown in Fig. 2, by a rearwardly extending pivotal diagonal strut 35, to resist drag stresses and stresses imposed on the landing gear by ground contact.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim:

1. Landing gear for aircraft having a fuselage comprising a pair of pivots adjacent the plane of symmetry of said fuselage, a landing gear strut depending from each said pivot, said struts being arranged for lateral swinging on said pivots between a substantially vertical position to oppositely outwardly and downwardly extending positions, means for swinging said struts, and a streamlined fairing carried by each said strut, said fairings having flat inner faces adapted to lie adjacent when said struts are vertical and having outer faces each in looking-glass symmetry to the other and so formed that when said struts are vertical and adjacent, the outer fairing faces together form a streamline cover for both said struts.

2. In a folding landing gear for aircraft, a pair of landing gear struts hinged to said aircraft symmetrically with respect to the aircraft plane of symmetry and movable to a folded position centrally below said aircraft, and symmetrical fairings carried by said struts, each fairing comprising half a streamline section whereby, when said landing gear is folded, said fairings cooperate to provide a full streamline section for both said struts.

3. In a folding landing gear for aircraft, a pair of landing gear struts hinged to said aircraft for symmetrical movement toward and away from the aircraft plane of symmetry, and movable to a folded position wherein said struts lie adjacent said plane of symmetry externally of the aircraft, and a partial streamline fairing carried by each said strut, the fairings of said struts being complementary in shape to form a complete streamline fairing for said struts when folded.

ARTHUR G. BUTLER.